(12) United States Patent
Twelves et al.

(10) Patent No.: US 10,646,977 B2
(45) Date of Patent: May 12, 2020

(54) ABRASIVE FLOW MACHINING METHOD

(71) Applicant: United Technologies Corporation, Farmington, CT (US)

(72) Inventors: Wendell V. Twelves, Glastonbury, CT (US); Joe Ott, Enfield, CT (US); Evan Butcher, Manchester, CT (US); John P. Rizzo, Jr., Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 372 days.

(21) Appl. No.: 15/185,554

(22) Filed: Jun. 17, 2016

(65) Prior Publication Data

US 2017/0361418 A1    Dec. 21, 2017

(51) Int. Cl.
*B24B 31/116* (2006.01)
*B24B 31/00* (2006.01)
(Continued)

(52) U.S. Cl.
CPC .......... *B24B 31/116* (2013.01); *B22F 3/1055* (2013.01); *B24B 31/006* (2013.01); *B24C 1/04* (2013.01); *B24C 3/325* (2013.01); *B24C 3/327* (2013.01); *B33Y 10/00* (2014.12); *B33Y 40/00* (2014.12); *F01D 5/18* (2013.01); *F01D 5/187* (2013.01); *B22F 2003/1059* (2013.01); *B22F 2003/247* (2013.01); *B22F 2202/15* (2013.01); *B22F 2999/00* (2013.01); *B33Y 99/00* (2014.12);
(Continued)

(58) Field of Classification Search
CPC ..... B24B 31/006; B24B 31/116; B24B 57/02; B24C 1/04; B24C 1/08; B24C 1/083; B24C 3/32; B24C 3/325; B24C 3/327; B24C 7/0007; B24C 7/0015; B24C 7/00; B24C 7/0023
See application file for complete search history.

(56) References Cited

U.S. PATENT DOCUMENTS

| 3,043,362 A | | 7/1962 | Mennesson | |
| 3,608,249 A | * | 9/1971 | Sullivan | B24C 3/327 451/40 |

(Continued)

FOREIGN PATENT DOCUMENTS

| EP | 0761386 | 3/1997 |
| EP | 2168721 | 3/2010 |

(Continued)

OTHER PUBLICATIONS

European Search Report for European Patent Application No. 17176716 dated Nov. 7, 2017.

*Primary Examiner* — Timothy V Eley
(74) *Attorney, Agent, or Firm* — Carlson, Gaskey & Olds, P.C.

(57) ABSTRACT

A method for abrasive flow machining includes moving an abrasive media through a high-aspect passage of a workpiece. Local pressure of the abrasive media is increased at target abrasion surfaces of the high-aspect passage using a passage geometry that is configured to direct flow of the abrasive media into the target abrasion surfaces such that the target abrasion surfaces are preferentially polished by the abrasive media over other, non-targeted surfaces of the high-aspect passage at which the flow of the abrasive media is not directed into.

14 Claims, 4 Drawing Sheets

(51) Int. Cl.
*B24C 3/32* (2006.01)
*B24C 1/04* (2006.01)
*B22F 3/105* (2006.01)
*B33Y 40/00* (2020.01)
*F01D 5/18* (2006.01)
*B33Y 10/00* (2015.01)
B22F 3/24 (2006.01)
*B33Y 99/00* (2015.01)

(52) U.S. Cl.
CPC .... *F05D 2250/25* (2013.01); *F05D 2260/209* (2013.01)

(56) References Cited

U.S. PATENT DOCUMENTS

| | | | |
|---|---|---|---|
| 4,005,549 A | 2/1977 | Perry | |
| 4,055,025 A * | 10/1977 | Seese | B24C 3/327 451/76 |
| 5,070,652 A | 12/1991 | Rhoades et al. | |
| 5,195,276 A * | 3/1993 | Vennerholm | B08B 3/04 134/7 |
| 5,290,364 A * | 3/1994 | Stein | B08B 5/02 134/22.1 |
| 5,391,256 A | 2/1995 | Hansen et al. | |
| 6,210,253 B1 | 4/2001 | Sammons | |
| 6,503,126 B1 * | 1/2003 | Rhoades | B24B 31/116 134/24 |
| 6,739,956 B2 * | 5/2004 | Noestheden | B22D 29/006 451/39 |
| 6,905,395 B2 | 6/2005 | Walch | |
| 7,144,302 B2 | 12/2006 | Bolz et al. | |
| 7,380,557 B2 * | 6/2008 | Shiraishi | B08B 9/057 134/22.1 |
| 7,637,800 B2 * | 12/2009 | Hamann | B24B 31/116 134/22.12 |
| 8,016,642 B2 * | 9/2011 | Kuroiwa | B24C 3/325 451/38 |
| 8,776,370 B2 | 7/2014 | Staroselsky et al. | |
| 2001/0018319 A1 | 8/2001 | Czech | |
| 2015/0375360 A1 | 12/2015 | Beckman | |

FOREIGN PATENT DOCUMENTS

| | | |
|---|---|---|
| WO | 9005044 | 5/1990 |
| WO | 20170142882 | 8/2017 |

* cited by examiner

ABRASIVE FLOW MACHINING METHOD

BACKGROUND

Components that are formed by casting, additive manufacturing, and the like may include internal cavities that, as-formed, have a higher surface roughness than is desired. A technique known as Abrasive Flow Machining ("AFM") can be used to polish the cavity surfaces. AFM typically involves pressurizing a paste-like abrasive media to flow through the cavity. The paste includes a high volume of abrasive particles that abrade the cavity surfaces and thus reduce roughness.

SUMMARY

A method for abrasive flow machining according to an example of the present disclosure includes moving an abrasive media though a high-aspect passage of a workpiece, and increasing local pressure of the abrasive media at target abrasion surfaces of the high-aspect passage using a passage geometry that is configured to direct flow of the abrasive media into the target abrasion surfaces such that the target abrasion surfaces are preferentially polished by the abrasive media over other, non-targeted surfaces of the high-aspect passage at which the flow of the abrasive media is not directed into.

In a further embodiment of any of the foregoing embodiments, the passage geometry includes a waveform shape of the passage.

In a further embodiment of any of the foregoing embodiments, the passage geometry includes a helical shape of the passage.

In a further embodiment of any of the foregoing embodiments, the passage geometry includes a helical rib.

In a further embodiment of any of the foregoing embodiments, the passage geometry includes a swirl vane.

In a further embodiment of any of the foregoing embodiments, the passage geometry includes a passage constriction at a passage turn.

In a further embodiment of any of the foregoing embodiments, the passage geometry includes a passage contraction leading into the passage constriction.

In a further embodiment of any of the foregoing embodiments, the passage geometry includes a bulbous end at a passage turn. The bulbous end have a distal corner.

A further embodiment of any of the foregoing embodiments includes pressurizing an exterior of the workpiece.

In a further embodiment of any of the foregoing embodiments, the high-aspect passage has a lateral dimension and a passage length from a passage inlet to a passage outlet, and a ratio of the passage length to the lateral dimension is about 4:1 or greater.

In a further embodiment of any of the foregoing embodiments, the ratio is about 10:1 or greater.

In a further embodiment of any of the foregoing embodiments, the ratio is about 25:1 or greater.

In a further embodiment of any of the foregoing embodiments, the abrasive media includes, by volume, 80% or less of a solid particulate.

In a further embodiment of any of the foregoing embodiments, the moving of the abrasive media through the high-aspect passage includes pressurizing the abrasive media to a pressure of about 0.5-700 MPa.

An article according to an example of the present disclosure includes an article body that has a high-aspect passage. The high-aspect passage has polished passage surfaces.

In a further embodiment of any of the foregoing embodiments, the high-aspect passage has a lateral dimension and a passage length from a passage inlet to a passage outlet, and a ratio of the passage length to the lateral dimension is about 4:1 or greater.

In a further embodiment of any of the foregoing embodiments, the ratio is about 10:1 or greater.

In a further embodiment of any of the foregoing embodiments, the ratio is about 25:1 or greater.

In a further embodiment of any of the foregoing embodiments, the polished passage surfaces have a surface roughness Ra that is less than about 30 microinches (0.76 micrometers).

In a further embodiment of any of the foregoing embodiments, the high-aspect passage is embedded in a wall of the article body.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Fabrication processes such as additive manufacturing have enabled article geometries that are difficult or impossible to make by other fabrication techniques. For example, components in gas turbine engines may include internal passages for conveying coolant. Additive manufacturing and other advances permit such passages to be formed with complex geometries in thin wall structures and with high-aspect ratio (i.e., the ratio of passage length to passage diametric size). However, due to the additive manufacturing process, and even in other fabrication processes, the internal surfaces of these passages are rough. If left in the final component, this surface roughness has the potential to debit component mechanical properties and debit coolant flow. The technique known as Abrasive Flow Machining ("AFM") might be used to polish a cavity or passage surface; however, the abrasive paste typically used in AFM is limited to low-aspect passages and can also produce uneven abrasion. As will be described below, although the method herein can be used to polish a variety of passage sizes and geometries, the method may be particularly useful for polishing high-aspect passages that could not otherwise be readily polished.

Figure 1:
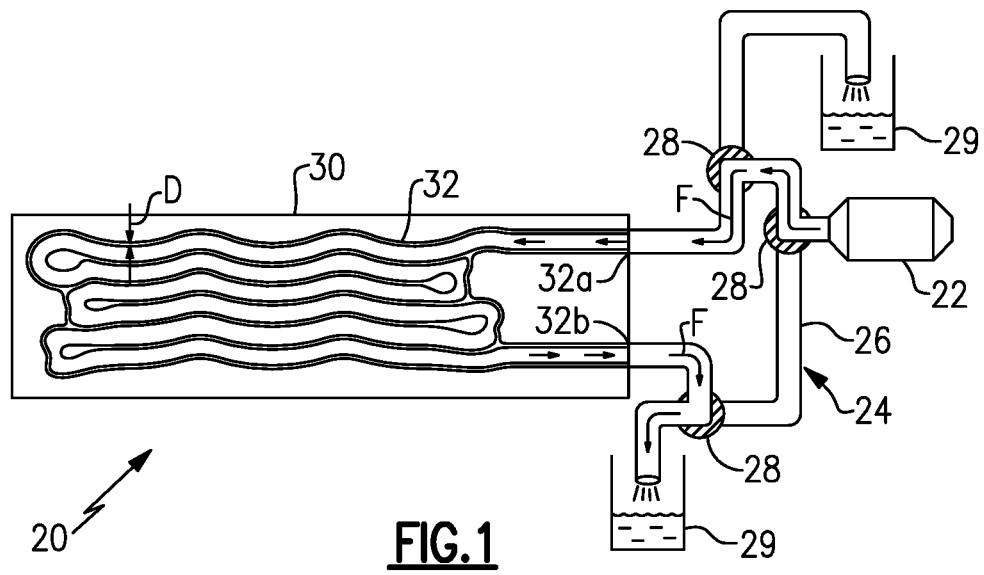
FIG. 1 illustrates an example abrasive flow machining system for conducting a method of abrasive flow machining.

FIG. 1 schematically illustrates an example abrasive flow machining system 20 ("system 20") that will be used to describe a method for abrasive flow machining. As will be appreciated, the particulars of the system 20 with regard to the hardware used may be modified for a particular implementation of the method. As shown, the system 20 includes a pump 22 that is fluidly connected to a tube network 24. The tube network 24 includes one or more tubes 26 for conveying an abrasive media, represented by flow F. The tube network 24 may include one or more valves 28 to control the direction of the flow F in the tube network 24, as well as one or more receptacles 29 for collecting used abrasive media.

A workpiece 30 is in a flow circuit with the tube network 24. The workpiece 30 includes an internal high-aspect passage 32 that is in flow communication with the tube network 24. The "aspect" of the passage 32 refers to the aspect ratio with regard to a lateral dimension D of the passage 32 and a length of the passage 32 from a passage inlet 32a to a passage outlet 32b. For example, the lateral dimension D is the minimum lateral dimension of the passage 32, and the passage inlet 32a and the passage outlet 32b are, respectively, ports of the workpiece 30. As will be appreciated, the inlet 32a and outlet 32b may switch, depending on the direction of flow of the abrasive media through the passage 32. For example, the aspect ratio of the passage (the ratio of the length to the lateral dimension D) is about 4:1 or greater. In further examples, the ratio is about 10:1 or greater or is about 25:1 or greater. Generally, increasingly higher ratios cause increasingly higher pressure drop of the flow of abrasive media.

The pump 22 is operable in the method to move the abrasive media, as flow F, through a portion of the tube network 24, into the passage 32, and then back into another portion of the tube network 24. The direction of flow F through the passage 32 may be reversed by changing the position of the one or more valves 28. The method may therefore include multiple bidirectional flow cycles through the passage 32 to polish the passage surfaces.

As mentioned, increasingly higher aspect ratios of the passage 32 cause increasingly higher pressure drop of the flow F of abrasive media. In this regard, the abrasive media of the method may have a low-viscosity formulation that facilitates enabling the pump 22 to move the abrasive media through the high-aspect passages 32. For example, the abrasive media includes a carrier liquid material and solid particulate (abrasive). The carrier liquid may be, but is not limited to, water, solvent, hydrocarbon, or mixtures thereof. The solid particulate may be, but is not limited to, silicon carbide, aluminum oxide, and mixtures thereof.

In particular, the volumetric amount of the solid particulate in the abrasive media is less than in a paste. While a paste may have 95 vol % or more of abrasive particulate, the abrasive media used in the method herein may have about 80 vol % or less of the solid particulate. The remainder of the abrasive media is the carrier liquid material and any impurities. In a further example, the abrasive media includes from about 30 vol % to about 80 vol % of the solid particulate. Higher amounts of solid particulate may increase the pressure necessary to flow the abrasive media through the high-aspect passage 32 to impractical levels, and lower amounts of the solid particulate may reduce the polishing effect. Typical pump 22 pressures for flow of the abrasive media through the high-aspect passage 32 may be as low as about 0.5-1.0 MPa up to about 700 MPa. In further examples, the method utilizes a pump pressure of about 34 MPa or greater, or about 172 MPa or greater. Abrasive media pressure for high viscosity abrasive flow machining operations on low aspect ratio passages will typically be between 15 MPa and 50 MPa.

While the low-viscosity abrasive media permits flow F though the high-aspect passage 32 at reasonable pressures, the abrasive media alone does not necessarily provide good abrasion in the passage 32. For instance, up to about 0.020 inches (0.508 mm) material removal may be desired. Uneven abrasion or too much or little abrasion in certain locations in the passage 32 may debit properties and performance. In this regard, in combination with the low-viscosity abrasive media, the passage 32 is configured to control the flow F to preferentially abrade target surfaces.

Figure 2:
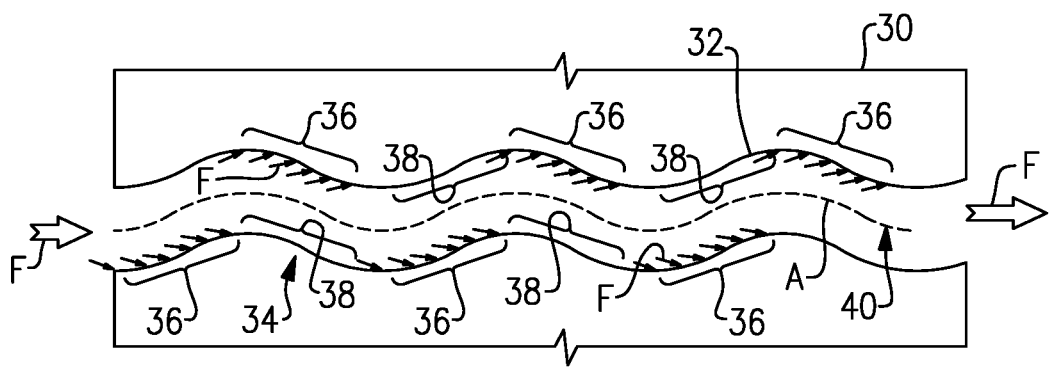
FIG. 2 illustrates an example representative portion of a passage of a workpiece in an abrasive flow machining method.

For example, FIG. 2 illustrates a representative portion of the passage 32 of the workpiece 30. The passage 32 has a passage geometry 34. A "passage geometry" may refer to the shape of the course of a passage, the shape of a structural feature in the passage 32, or a combination of these. The passage geometry 34 is configured to direct the flow F of the abrasive media into (i.e. impinge upon) target abrasion surfaces 36 such that the target abrasion surfaces 36 are preferentially polished over other, non-targeted surfaces 38 at which the flow F of the abrasive media is not directed into.

In the illustrated example, the passage geometry 34 is a waveform shape 40 of the course of the passage 32, represented by central passage axis A. The "waves" of the waveform shape 40 serves as ramps to direct the flow F into the target abrasion surfaces 36, thereby increasing local pressure of the abrasive media at the target abrasion surfaces 36. The increased local pressure forces more of the solid particulate in the abrasive media into contact with the target abrasion surfaces 36, thus preferentially polishing those surfaces. In this example, each target abrasion surface 36 of the waveform shape 40 serves as the ramp for directing the flow F toward the next target abrasion surface 36. The non-targeted surfaces 38 are on the backsides of the ramps, which has decreased local pressure due to deflection of the flow F away from surfaces 38. For example, the waveform shape 40 is a continuous waveform that is free of any linear sections, a regular waveform that has consecutive peaks of common amplitude, a blind waveform such that there is no linear path or line-of-sight down the passage 32 at that particular passage section, or combinations thereof. In further examples, the pitch and amplitude of the waveform is irregular and does not repeat size or shape. For instance, the waveform may vary continuously along the length of the passage 32. Whether regular or irregular, the passage 32 is always changing direction and thereby forcing the abrasive media to change direction and scrub/abrade the walls of the passage 32.

Figure 3:
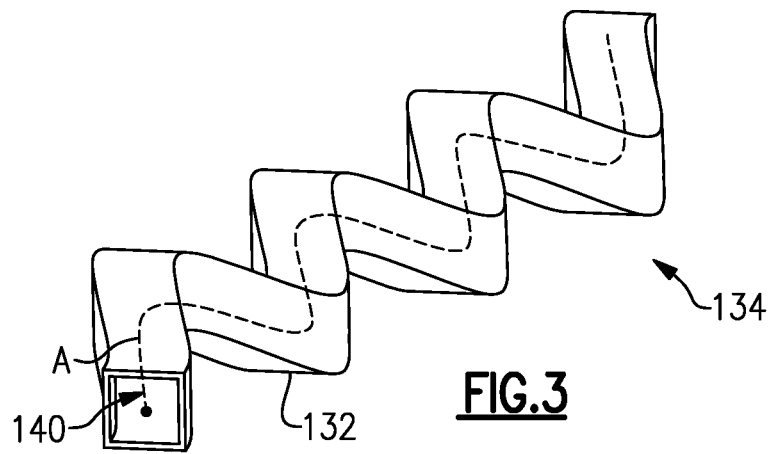
FIG. 3 shows an isometric view of a passage that has a passage geometry with a helical shape.

The waveform shape 40 of the passage 32 may be two-dimensional, as shown in FIG. 2, wherein the central passage axis A oscillates in only two directions. Alternatively, FIG. 3 shows an isometric view of a passage 132. In this disclosure, like reference numerals designate like elements where appropriate and reference numerals with the addition of one-hundred or multiples thereof designate modified elements that are understood to incorporate the same features and benefits of the corresponding elements. The passage 132 has a passage geometry 134 with a waveform shape 140 that is three-dimensional such that the central passage axis A oscillates in three directions. For instance, in the example shown, the waveform shape 140 is a helical shape.

Figure 4:
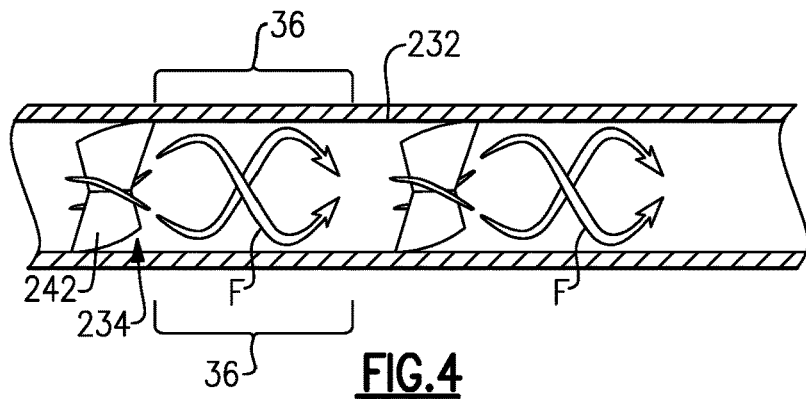
FIG. 4 shows another example of a passage that has a passage geometry that includes swirl vanes.

FIG. 4 illustrates a representative section of another example passage 232. In this example, the passage 232 has a passage geometry 234 that includes one or more swirl vanes 242. The swirl vane or vanes 242 serve in the method to rotate the flow F of the abrasive media and thus centrifugally drive the abrasive media toward the outside of the passage 232 against targeted abrasion surfaces 36. In a straight passage with no swirl vanes, flow tends to be greater along the center of the passage and lowest at the passage walls due to friction. Such flow thus poorly abrades the walls. In contrast, the swirl vane(s) 242 alter that flow tendency by driving the flow F outwards to obtain enhanced flow and pressure at the targeted abrasion surfaces 36.

Additionally, as the process progresses, the abrasive media may erode the swirl vane(s) 242, thereby reducing the rotational flow effect. However, the initial stage of flow F in the method prior to substantial erosion may already have produced the desired abrasion and polishing. Therefore, the erosion, and resulting partial or complete removal of the swirl vane(s) 242, serves the potentially beneficial effect of also removing the swirl vane(s) 242 after it has served its primary purpose. That is, the swirl vane(s) 242 is a sacrificial structure that functions in the method to enhance abrasion and polishing but is not needed or desired for function in the final component.

Figure 5:
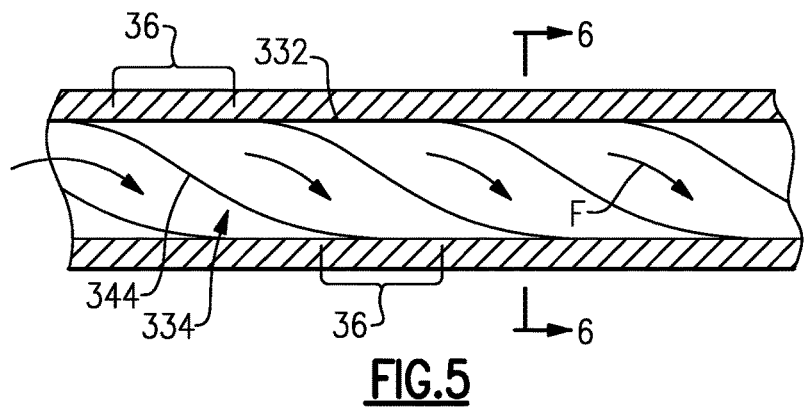
FIG. 5 illustrates another example passage that has a passage geometry that includes helical ribs.
Figure 6:
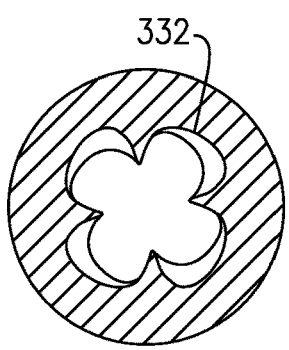
FIG. 6 illustrates a cross-sectional view of the passage of FIG. 5.

FIG. 5 illustrates another example passage 332. In this example, the passage 332 has a passage geometry 334 that includes one or more helical ribs 344. For example, the helical ribs 344 may be "positive" protruding ridges or "negative" grooves in the passage 332. The sectioned view in FIG. 6 shows an example of the helical ribs 344 in the form of the "positive" protruding ridges. Similar to the swirl vane(s) 242, the helical ribs 344 rotate the flow F of the abrasive media and thus centrifugally drive the abrasive media toward the target abrasion surfaces 36 at the outside of the passage 332.

Figure 7:
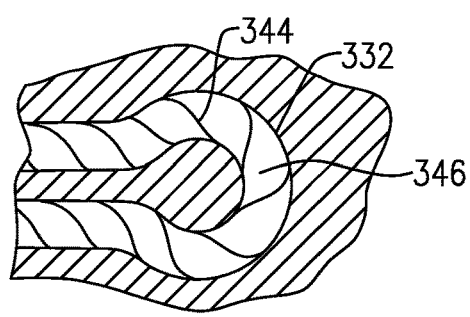
FIG. 7 illustrates a passage with a turn and helical ribs that extend through the turn.
Figure 8:
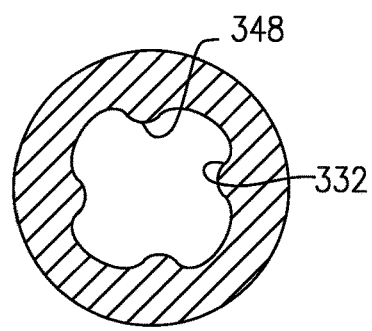
FIG. 8 illustrates a representative portion of an article after an abrasive flow machining method in which helical ribs have been eroded away, leaving vestiges of the ribs.

As shown in FIG. 5, the helical ribs 344 may be in a linear or near-linear section of the passage 332. Alternatively, as shown in FIG. 7, the passage 332 may have a turn 346 and the helical ribs 344 may extend through the turn 346. As shown in FIG. 8, similar to the erosion of the swirl vane(s) 242, the helical ribs 344 may fully or partially erode during the process. In this example, upon completion of the abrasive flow machining method, one or more vestiges 348 of the helical ribs 344 may remain.

Figure 9:
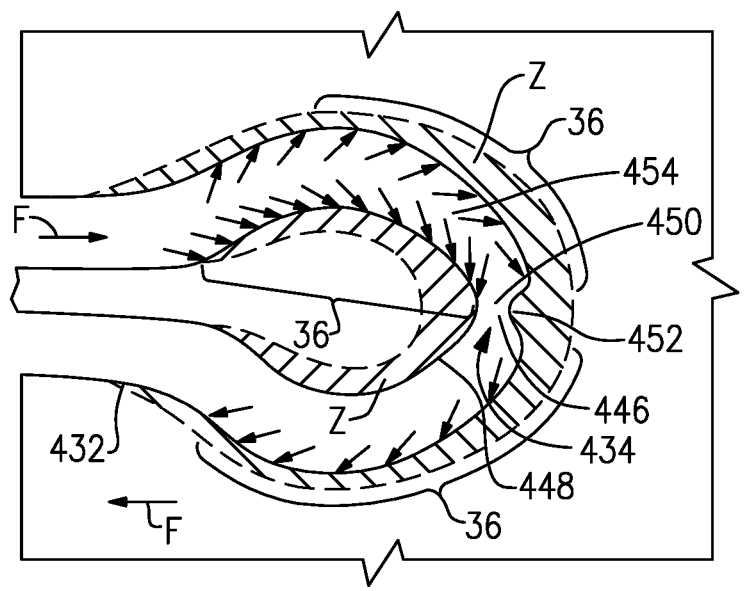
FIG. 9 illustrates another example passage that includes a passage constriction at a passage turn and a passage contraction that leads into the passage constriction.

FIG. 9 illustrates another example passage 432 that includes a turn 446 and a bulbous end 448 (rib) at the turn 446. In this example, the passage 432 has a passage geometry 434 that includes a passage constriction 450 in the passage turn 446. In this example, the passage 432 includes a protrusion 452 that forms the passage constriction 450. The passage constriction 450 serves to direct flow F of the abrasive media into target abrasion surfaces 36 in the passage constriction 450 and immediately upstream of the passage constriction 450. In this example, the material in the passage 432 that is to be removed by the abrasion and polishing is shown in zone Z encompassed by a dashed line.

Additionally or alternatively, the passage 432 may include a passage contraction 454 at which the passage 432 gradually narrows. The passage contraction 454 directs flow F of the abrasive media into target abrasion surfaces 36 in the passage contraction 454.

Figure 10:
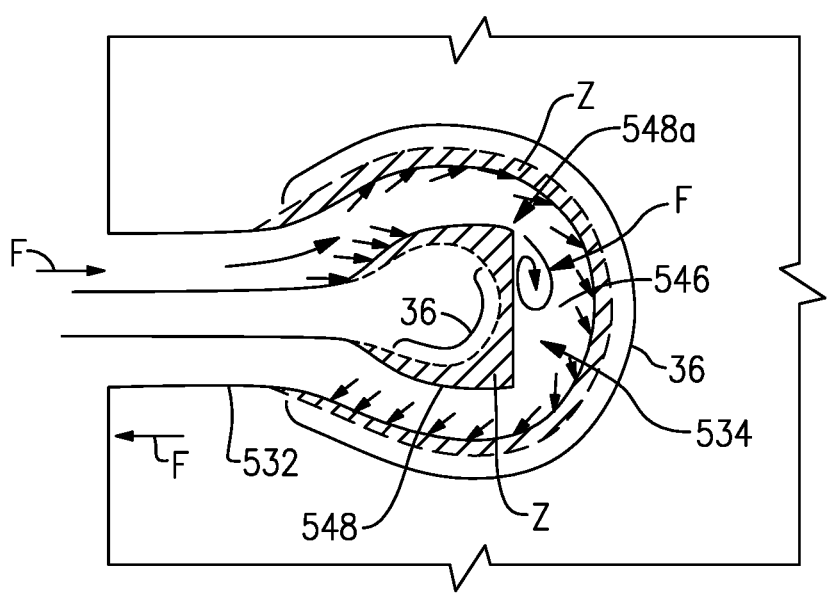
FIG. 10 illustrates another example passage that has a bulbous end with a distal corner.

FIG. 10 illustrates another example passage 532 that has a passage geometry 534 that includes a bulbous end 548 (rib) at a passage turn 546. In this example, rather than having an initially completely rounded geometry, the bulbous end 548 has a distal corner 548a that serves to produce a swirl or vortex in the flow F of the abrasive media. The swirl or vortex directs the flow F into target abrasion surfaces 36 immediately downstream of the distal corner 548a. Some of those target abrasion surfaces 36 are on the outside of the turn 546, while other of the target abrasion surfaces 36 are on the inside of the turn 546 on the bulbous end 548.

Figure 11:
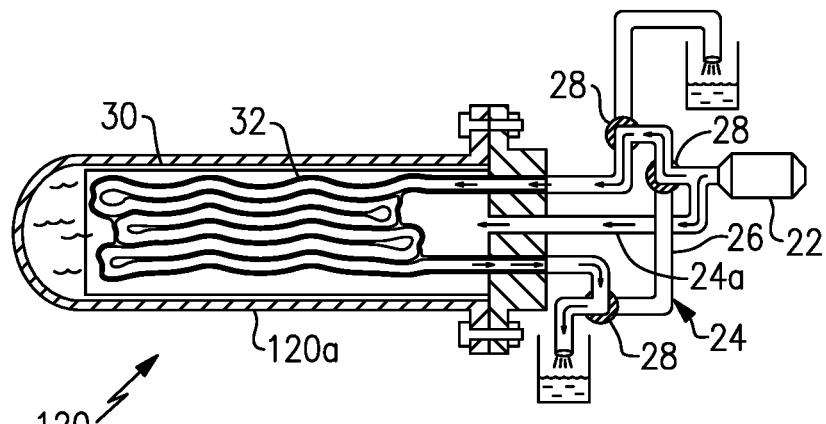
FIG. 11 illustrates another example abrasive flow machining system for use in a method of abrasive flow machining with exterior pressurization of a workpiece.

FIG. 11 shows another example system 120 that is similar to the system 20, but includes a pressure vessel 120a in which the workpiece 30 is arranged. The tube network 24 is connected to the passage 32 of the workpiece 30 through the walls of the pressure vessel 120a. In this example, the tube network 24 includes an additional tube section 24a that is connected to the interior of the pressure vessel 120a such that the abrasive media can flow around the outside of the workpiece 30 and thereby pressure the exterior of the workpiece 30. Alternatively, the tube section 24a could be connected to a separate pump to pressure the exterior of the workpiece 30 using a gas, a liquid, or other fluid different than the abrasive media. The pressure around the exterior of the workpiece 30 serves to balance the internal pressure produced within the passage 32 from the abrasive media. For example, in thin-walled structures that could potentially be deformed or damaged by such internal pressure, the balancing pressure at the exterior of the workpiece 30 can be used to reduce or eliminate such deformation or damage.

The method herein may also include fabrication of the workpiece 30. As an example, the workpiece 30 is fabricated by additive manufacturing. Additive manufacturing involves feeding a powdered material, such as an alloy, into a machine, which may provide a vacuum, for example. The machine deposits multiple layers of powdered material onto one another. The layers are selectively joined to one another with reference to Computer-Aided Design data to form solid structures that relate to a particular cross-section of the workpiece 30. In one example, the powdered material is selectively melted using a direct metal laser sintering process or an electron-beam melting process. Other layers or portions of layers corresponding to negative features, such as passages, cavities or openings, are not joined and thus remain as a powdered material. The unjoined powder material may later be removed using blown air, for example. With the layers built upon one another and joined to one another cross-section by cross-section, the workpiece 30 is produced. The workpiece 30 may be post-processed to provide desired structural characteristics. For example, the workpiece 30 may be heated to reconfigure the joined layers into a single crystalline structure. Subsequently, the workpiece 30 is subjected to the abrasive flow machining, such as in the system 20/120, to polish the surfaces of the passage 32/132/232/332/432/532.

Figure 12:
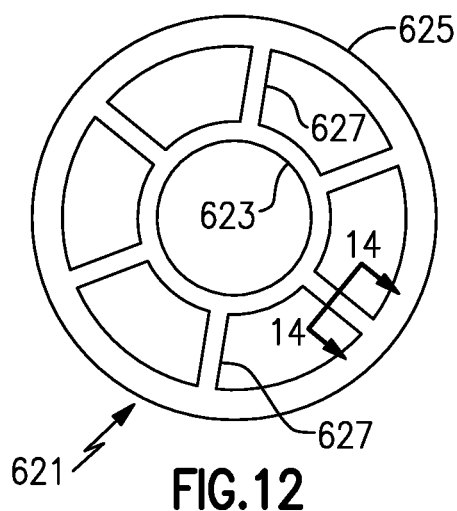
FIG. 12 illustrates an example article processed according to a method herein.

FIG. 12 illustrates an example article 621 that has been processed according to the method described herein. For instance, the article 621 is, initially, the workpiece 30. In this example, the article (body) 621 is a vane structure that has an inner ring 623, an outer ring 625, and a plurality of airfoil vanes 627 that integrally connect the inner ring 623 with the outer ring 625. As an example, the vane structure may be used in a gas turbine engine.

Figure 13:
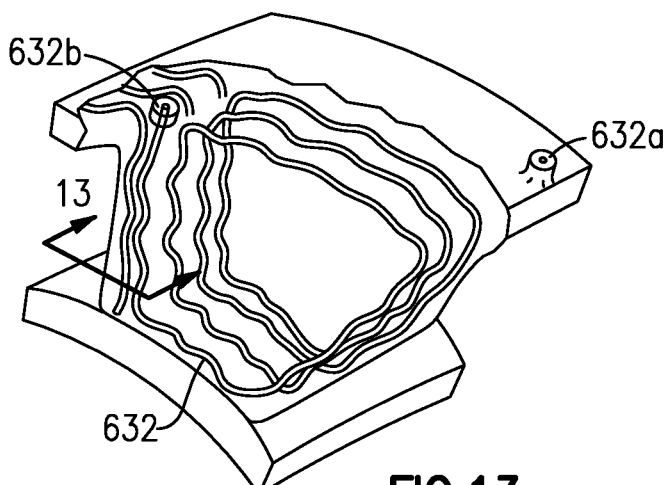
FIG. 13 illustrates a portion of the article of FIG. 11 with a section cutaway.
Figure 14:
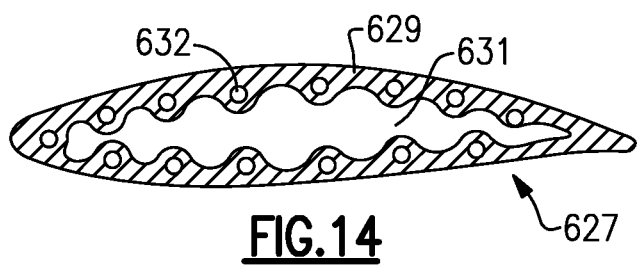
FIG. 14 illustrates a sectioned view of the article of FIG. 11.

FIG. 13 shows a cutaway view of the article 621 to reveal passages 632. In this example, the passages 632 have a passage geometry of waveform shape, as described herein above. The passages 632 are fluidly connected with ports 632a/632b. The ports 632a/632b serve as the inlet and outlet in connection with the tube network 24 in the system 20/120. The passages 632 are high-aspect passages that have, as described above, an aspect ratio of about 4:1 or greater, about 10:1 or greater, or about 25:1 or greater. As shown in FIG. 14, the passages 632 are embedded in walls 629 of the article body. In this example, the airfoil vanes 627 also has a central internal hollow cavity 631.

The surfaces of the passage 632 have been polished according to the method described herein such that the surface roughness $R_a$ is less than about 30 microinches (0.76 micrometers). In further examples, the surface roughness $R_a$ may more typically be 5-15 microinches (0.127-0.381 micrometers) or even 2-3 microinches (0.05-0.08 micrometers) for a highly polished surface. The method herein is not limited to use in fabricating the article 621. As will be appreciated, the method may be used for other airfoil structures, airfoil blades, outer air seals, heat exchangers, and any other article that has high-aspect passages.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for abrasive flow machining, the method comprising:
   moving an abrasive media though a high-aspect passage of a workpiece; and
   increasing local pressure of the abrasive media at target abrasion surfaces of the high-aspect passage using a passage geometry that is configured to direct flow of the abrasive media into the target abrasion surfaces such that the target abrasion surfaces are preferentially polished by the abrasive media over other, non-targeted surfaces of the high-aspect passage at which the flow of the abrasive media is not directed into, wherein the passage geometry includes a waveform shape of the passage.

2. The method as recited in claim 1, further comprising balancing an internal pressure of the work piece by pressurizing an exterior of the workpiece.

3. The method as recited in claim 1, wherein the high-aspect passage has a lateral dimension and a passage length from a passage inlet to a passage outlet, and a ratio of the passage length to the lateral dimension is about 4:1 or greater.

4. The method as recited in claim 3, wherein the ratio is about 10:1 or greater.

5. The method as recited in claim 3, wherein the ratio is about 25:1 or greater.

6. The method as recited in claim 1, wherein the abrasive media includes, by volume, 80% or less of a solid particulate.

7. The method as recited in claim 1, wherein the moving of the abrasive media through the high-aspect passage includes pressurizing the abrasive media to a pressure of about 0.5-700 MPa.

8. The method as recited in claim 1, wherein the waveform shape has at least one wave, the at least one wave having a peak extending towards a center of the high-aspect passage.

9. The method as recited in claim 8, wherein the peak has a downstream surface and an upstream surface relative to the movement of the abrasive media.

10. The method as recited in claim 9, wherein the upstream surface is configured to act as a ramp for the abrasive media.

11. The method as recited in claim 9, wherein the local pressure of the abrasive media is higher on the upstream surface than the downstream surface.

12. The method as recited in claim 9, wherein the upstream surface is a target abrasion surface of the target abrasion surfaces and the downstream surface is a non-target abrasion surface of the non-target abrasion surfaces.

13. The method as recited in claim 9, wherein the upstream surface is preferentially polished as compared to the downstream surface.

14. The method as recited in claim 1, wherein the high-aspect passage oscillates about a central axis in two directions such that the waveform is two-dimensional.

* * * * *